United States Patent
Fitzthum et al.

(10) Patent No.: US 9,388,630 B1
(45) Date of Patent: Jul. 12, 2016

(54) WINDOW BLIND PROTECTOR

(71) Applicants: Kate Fitzthum, Bothell, WA (US); Don Fitzthum, Everett, WA (US)

(72) Inventors: Kate Fitzthum, Bothell, WA (US); Don Fitzthum, Everett, WA (US)

( * ) Notice: Subject to any disclaimer, the term of this patent is extended or adjusted under 35 U.S.C. 154(b) by 0 days.

(21) Appl. No.: 14/835,061

(22) Filed: Aug. 25, 2015

Related U.S. Application Data

(60) Provisional application No. 62/168,626, filed on Jun. 10, 2015.

(51) Int. Cl.
*E06B 7/28* (2006.01)
*A47H 27/00* (2006.01)
*A01K 29/00* (2006.01)
*A01K 1/035* (2006.01)
*E06B 9/38* (2006.01)

(52) U.S. Cl.
CPC . *E06B 7/28* (2013.01); *A01K 1/035* (2013.01); *A01K 29/00* (2013.01); *A47H 27/00* (2013.01); *E06B 9/38* (2013.01)

(58) Field of Classification Search
CPC .............. E06B 9/42; E06B 9/58; E06B 7/28; E06B 9/38; A47K 29/00; A47K 1/035; A47H 27/00
USPC ....... 160/349.2, 349.1, 178.1 R, 178.1 V, 352
See application file for complete search history.

(56) References Cited

U.S. PATENT DOCUMENTS

| | | | | |
|---|---|---|---|---|
| 268,968 | A * | 12/1882 | Willie | E04F 10/10 160/58.1 |
| 324,291 | A * | 8/1885 | Bennett | A47H 27/00 211/189 |
| 2,981,256 | A * | 4/1961 | Besnah | A47C 31/00 135/87 |
| 5,020,756 | A * | 6/1991 | Bauer | A47B 96/061 248/236 |
| 8,720,372 | B2 * | 5/2014 | Hermawan | A01K 1/035 119/28.5 |
| 2010/0170643 | A1 * | 7/2010 | De France | A47H 27/00 160/127 |

* cited by examiner

*Primary Examiner* — Blair M Johnson
(74) *Attorney, Agent, or Firm* — Ruttler Mills, PLLC; James J. Ruttler

(57) ABSTRACT

This invention relates generally to a window blind protector, and more specifically, to a device that is positionable on or in a window frame to stop or divert a window blind away from a window sill for allowing access to the window sill. In one embodiment, a device includes, but is not limited to, a first panel that is positionable on a first side of a window sill and that includes a first guide portion; a second panel that is positionable on a second side of the window sill and that includes a second guide portion; and a first cross-member that is configured to extend between the first panel and the second panel to brace the first and second panels against opposing walls of the window frame, wherein the first and second guide portions are configured to divert a window blind away from the window sill when the window blind is lowered.

18 Claims, 10 Drawing Sheets

U.S. 9,388,630 B1

WINDOW BLIND PROTECTOR

PRIORITY CLAIM

This application is a non-provisional application of U.S. provisional application 62/168,626 having a filing date of Jun. 10, 2015. The foregoing application is incorporated by reference in its entirety as if fully set forth herein.

FIELD OF THE INVENTION

This invention relates generally to a window blind protector, and more specifically, to a device that is positionable on or in a window frame to stop or divert a window blind away from a window sill for allowing access to the window sill.

SUMMARY

This invention relates generally to a window blind protector, and more specifically, to a device that is positionable on or in a window frame to stop or divert a window blind away from a window sill for allowing access to the window sill.

In one embodiment, a device includes, but is not limited to, a first panel that is positionable on a first side of a window sill and that includes a first guide portion; a second panel that is positionable on a second side of the window sill and that includes a second guide portion; and a first cross-member that is configured to extend between the first panel and the second panel to brace the first and second panels against opposing walls of the window frame, wherein the first and second guide portions are configured to divert a window blind away from the window sill when the window blind is lowered.

In another embodiment, a device includes, but is not limited to, a first retractable panel that is positionable on a first side of a window sill and that includes a first guide portion, the first guide portion having an incline portion and a vertical portion; a first vertical tab that extends from the first retractable panel to a point above the first guide portion; a second retractable panel that is positionable on a second side of the window sill and that includes a second guide portion, the second guide portion having an incline portion and a vertical portion; a second vertical tab that extends from the second retractable panel to a point above the second guide portion; a first cross-member that is configured to extend between the first vertical tab and the second vertical tab to brace the first and second retractable panels against opposing walls of the window frame, wherein the first and second guide portions are configured to divert a window blind away from the window sill under the first cross-member and along the incline and vertical portions when the window blind is lowered.

In a further embodiment, a device includes, but is not limited to, a first panel that is positionable on a first side of a window sill; a second panel that is positionable on a second side of the window sill; a first cross-member that is configured to extend between the first panel and the second panel to brace the first and second panels against opposing walls of the window frame; and a retractably extensible visual shield disposed between the first and second panels, wherein the device is configured to support a window blind above the window sill when the window blind is lowered.

BRIEF DESCRIPTION OF THE DRAWINGS

Embodiments of the present invention are described in detail below with reference to the following drawings.

DETAILED DESCRIPTION

This invention relates generally to a window blind protector, and more specifically, to a device that is positionable on or in a window frame to stop or divert a window blind away from a window sill for allowing access to the window sill.

Figure 1:
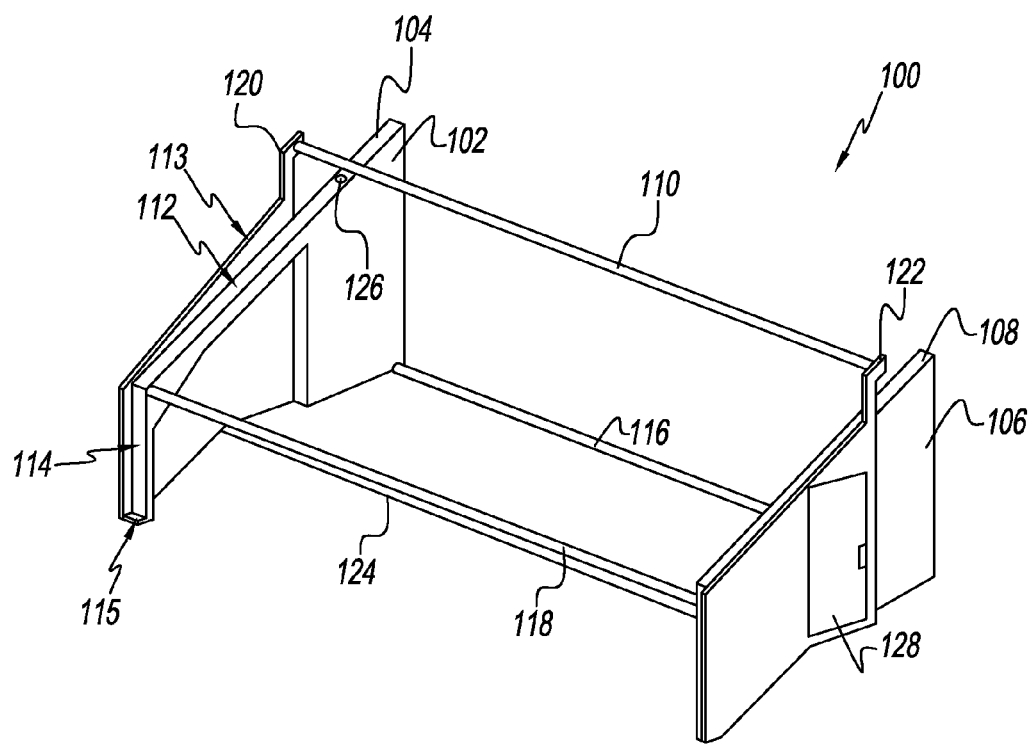
FIG. 1 is a perspective view of a window blind protector, in accordance with an embodiment of the invention.

FIG. 1 is a perspective view of a window blind protector 100, in accordance with an embodiment of the invention. In one embodiment, a window blind protector 100 includes, but is not limited to, a first panel 102 that is positionable on a first side of a window sill (not shown) and that includes a first guide portion 104; a second panel 106 that is positionable on a second side of the window sill (not shown) and that includes a second guide portion 108; and a first cross-member 110 that is configured to extend between the first panel 102 and the second panel 106 to brace the first 102 and second panels 106 against opposing walls of the window frame (not shown), wherein the first 104 and second 108 guide portions are configured to divert a window blind (not shown) away from the window sill (not shown) when the window blind (not shown) is lowered.

In one particular embodiment, the first 104 and second 108 guide portions have an inclined portion 112 and a vertical portion 114. In yet a further embodiment, the first cross member 110 is retractably extensible. In an additional embodiment, the first cross member 110 is a tension rod. In another embodiment, the first 104 and second 108 guide portions are ledges. In an alternative embodiment, a second cross-member 116 is configured to extend between the first panel 102 and the second panel 106 below the first cross-member 110 to further brace the first 102 and second 106 panels against opposing walls of the window frame (not shown). In a further embodiment, a third cross-member 118 is configured to adjustably extend between opposing ends of the first 102 and second 106 panels. In one particular embodiment, the first panel 102 includes a first vertical tab 120 that extends from the first panel 102 to a point above the first guide portion 104 and that is adjustable (not shown) along at least a portion of a length of the first panel 102 and wherein the second panel 106 includes a second vertical tab 122 that extends from the second panel 106 to a point above the second guide portion 108 and that is adjustable (not shown) along at least a portion of a length of the second panel 106. In yet another embodiment, the device includes at least one retractably extensible platform 124 that extends between the first panel 102 and the second panel 106 for extending a window sill (not shown). In yet another particular embodiment, the device includes at least one motor 126 configured to coil and release at least one string of the window blind (not shown); and at least one control unit (not visible) configured to operate the at least one motor 126 in accordance with one or more instructions. In on embodiment, at least one of the first panel 102 or the second panel 106 includes an access door 128.

While preferred and alternate embodiments of the device have been illustrated and described, as noted above, many changes can be made without departing from the spirit and scope of the invention. For example, the first 102 and the second 106 panels can be differently sized and shaped (e.g., taller, thicker, longer, shorter, thinner, etc.). The first 102 and the second 106 panels can be limited to merely the first 104 and second 108 guide portions without additional structure. The first 104 and second 108 guide portions can be wider or narrower and alternatively can include a tunnel or channel or the like. A cover (not shown) can extend over the first 104 and second 108 guide portions between the first 102 and second 106 panels to cover a lowered blind (not shown). The inclined portion 112 can be more or less inclined and can include a sidewall 113 portion to limit lateral movement of a lowered blind (not shown). The vertical portion 114 can be substantially vertical or approximately vertical or can be omitted altogether. A stop portion 115 can be included to limit extension of a window blind (not shown). The first cross member 110, the second cross member 116, or the third cross member 118 can be length adjustable, fixed, tension biased and may be substituted or replaced with any other similar functioning structure (e.g., bar, member, plate, tube, etc.). The first 120 and the second 122 vertical tabs can extend higher or lower or can be fixedly or movably positioned higher or lower relative to the first 104 and second 108 guide portions. The first 120 and second 122 vertical tabs can be substantially vertical or differently angled. Alternatively, the first 120 and second 122 vertical tabs can be omitted. The motor 126 can include an electric motor and can be positioned differently such as relative to the first panel 102 or even on the second panel 106 or omitted entirely. The platform 124 can be fixed to the first 102 and second 106 panels or can be removably secured therebetween, such as by hooking a rear portion of the panel 124 under the second cross member 116. The platform 124 can include a fixed width or length or be adjustable. The access door 128 can be differently sized or shaped or positioned, such as further forward or aft on the first 102 or the second 106 panels. Alternatively, the access door 128 can be omitted. In certain embodiments, the first panel 102 and the second panel 106 are at least one of collapsible or foldable. In other embodiments, the first panel 102 and the second panel 106 are retractable extensible to adjust a length of the first 104 and second 108 guide portions. In yet a further embodiment, the first 104 and second 108 guide portions are movable relative to the first 102 and second 106 panels to adjust at least one of a position or angle of the first 104 and second 108 guide portions.

Figure 2:
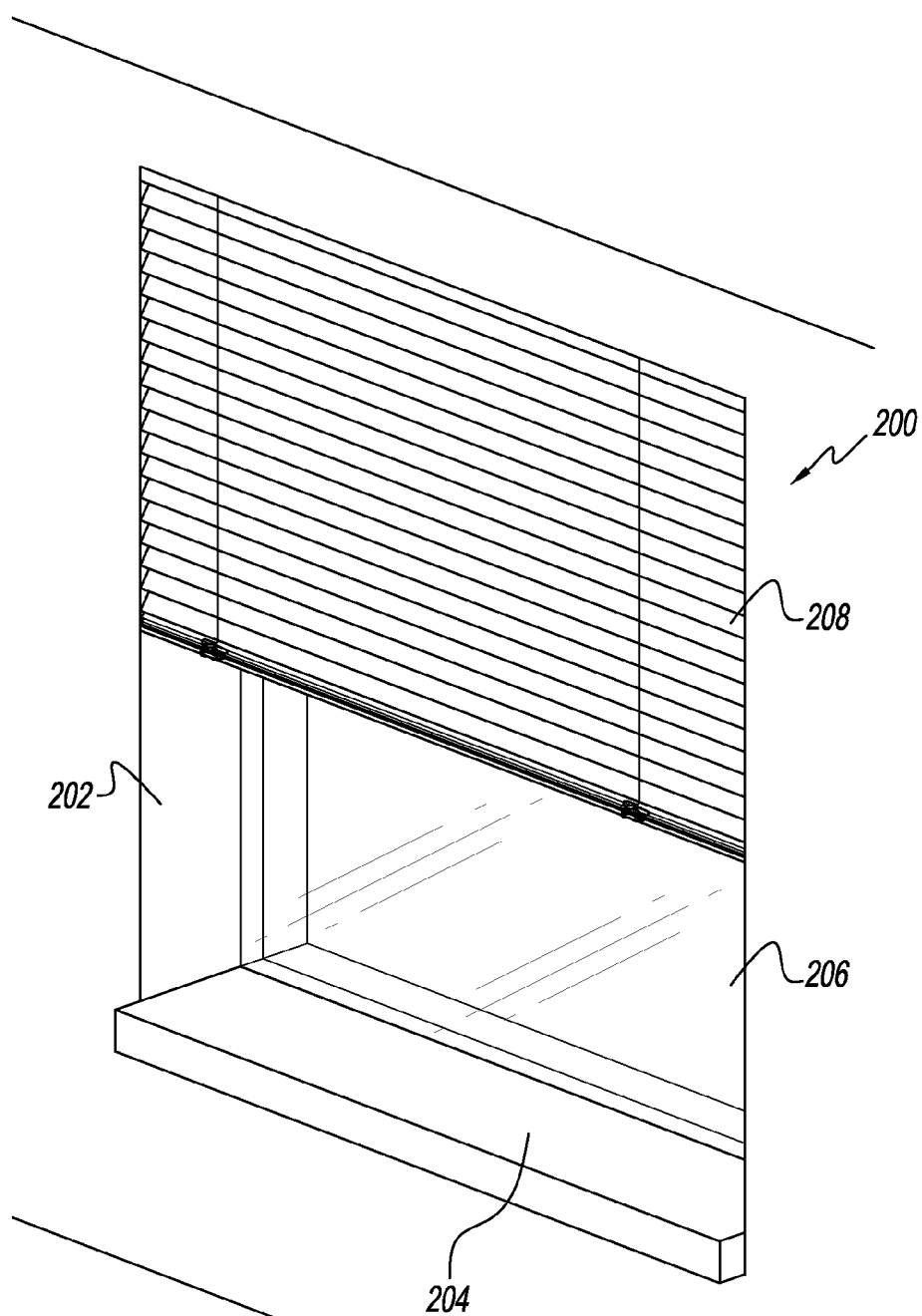
FIG. 2 is a perspective view of a window.

FIG. 2 is a perspective view of a window. Window 200 includes a window frame 202 and a window sill 204 and a window 206. A window blind 208 is positioned within the window frame 202 and configured to raise and lower to cover the window 206.

Figure 3:
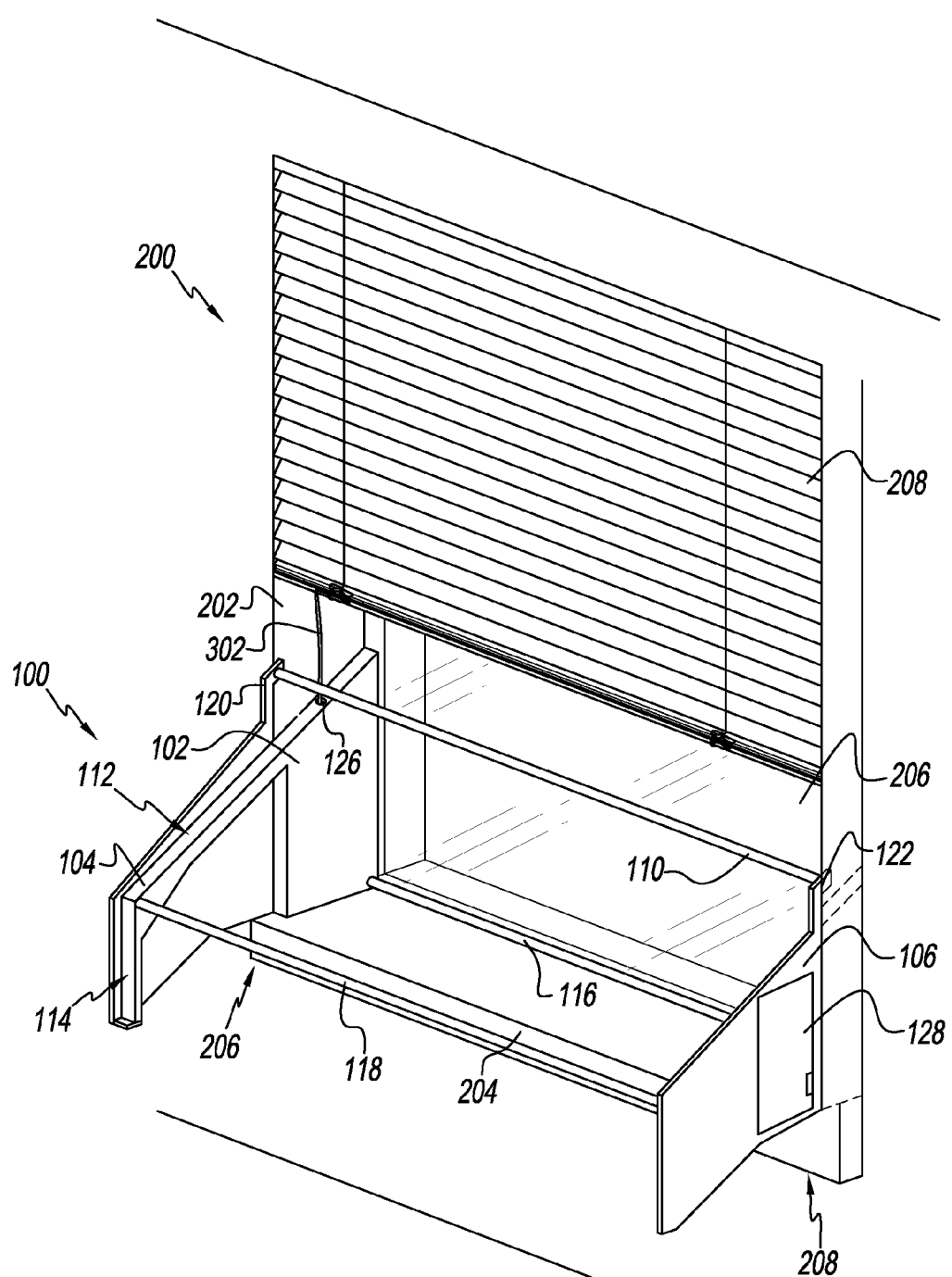
FIG. 3 is a perspective view of a window blind protector positioned within a window frame of a window, in accordance with an embodiment of the invention.

FIG. 3 is a perspective view of a window blind protector 100 positioned within a window frame 202 of a window 200, in accordance with an embodiment of the invention. In one embodiment, a window blind protector 100 includes, but is not limited to, a first panel 102 that is positionable on a first side 206 of a window sill 204 and that includes a first guide portion 104; a second panel 106 that is positionable on a second side 208 of the window sill 204 and that includes a second guide portion (not visible); and a first cross-member 110 that is configured to extend between the first panel 102 and the second panel 106 to brace the first 102 and second panels 106 against opposing walls of the window frame 202 on the window sill 204, wherein the first 104 and second (not visible) guide portions are configured to divert window blind 208 away from the window sill 204 when the window blind 208 is lowered.

In one particular embodiment, the first 104 and second (not visible) guide portions have an inclined portion 112 and a vertical portion 114. In yet a further embodiment, the first cross member 110 is retractably extensible. In an additional embodiment, the first cross member 110 is a tension rod. In another embodiment, the first 104 and second (not visible) guide portions are ledges. In an alternative embodiment, a second cross-member 116 is configured to extend between the first panel 102 and the second panel 106 below the first cross-member 110 to further brace the first 102 and second 106 panels against opposing walls of window frame 202. In a further embodiment, a third cross-member 118 is configured to adjustably extend between opposing ends of the first 102 and second 106 panels. In one particular embodiment, the first panel 102 includes a first vertical tab 120 that extends from the first panel 102 to a point above the first guide portion 104 and that is adjustable (not shown) along at least a portion of a length of the first panel 102 and wherein the second panel 106 includes a second vertical tab 122 that extends from the second panel 106 to a point above the second guide portion (not visible) and that is adjustable along at least a portion of a length of the second panel 106. In yet another particular embodiment, the device includes at least one motor 126 configured to coil and release at least one string 302 of the window blind 208; and at least one control unit (not visible) configured to operate the at least one motor 126 in accordance with one or more instructions. In one embodiment, at least one of the first panel 102 or the second panel 106 includes an access door 128.

Figure 4:
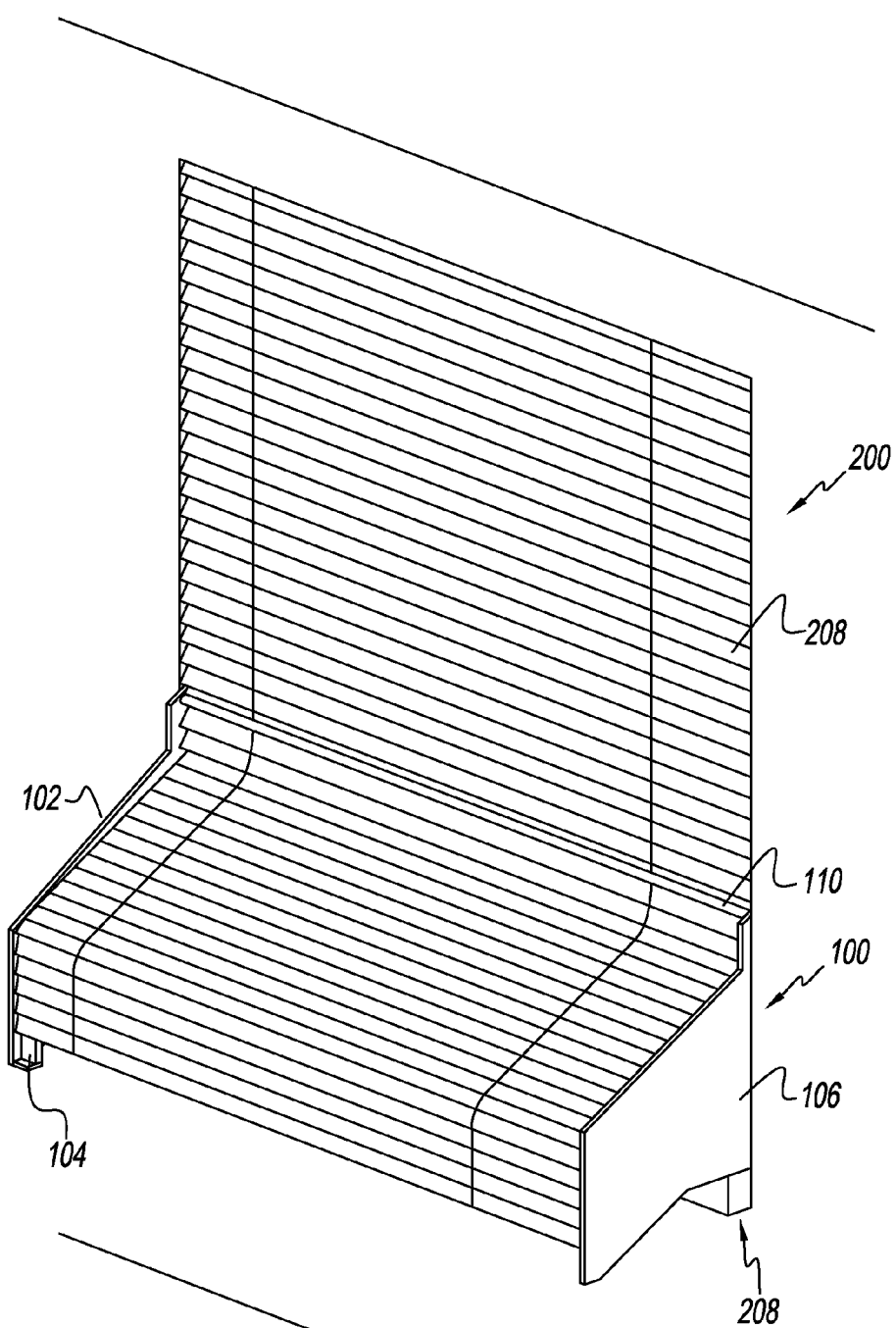
FIG. 4 is a perspective view of a window blind protector positioned within a window frame of a window, in accordance with an embodiment of the invention.

FIG. 4 is a perspective view of a window blind protector 100 positioned within a window frame (not visible) of a window 200, in accordance with an embodiment of the invention. In one embodiment, a window blind protector 100 includes, but is not limited to, a first panel 102 that is positionable on a first side 206 of a window sill (not visible) and that includes a first guide portion 104; a second panel 106 that is positionable on a second side 208 of the window sill (not visible) and that includes a second guide portion (not visible); and a first cross-member 110 that is configured to extend between the first panel 102 and the second panel 106 to brace the first 102 and second panels 106 against opposing walls of the window frame (not visible) on the window sill (not visible). The first 104 and second (not visible) guide portions are shown diverting window blind 208 away from the window sill (not visible). Thus, the window blind protector 100 establishes a space below the lowered window blind 208 and the window 200, which space allows access and usage of a window sill without sacrificing privacy.

While preferred and alternate embodiments of the device have been illustrated and described, as noted above, many changes can be made without departing from the spirit and scope of the invention. In certain embodiments, the first cross member 110 can be positioned behind the window blind 208. In other embodiments, additional cross members or panels or covers (not shown) can be extended over or under the window blind 208 between the first 102 and second 106 panels. In other embodiments, first 102 and second 106 panels can be configured to divert the window blind 208 further below or even above a horizontal plane associated with a window sill (not visible). In further embodiments, one or more steps can be coupled to the window blind protector 100, such as to facilitate access by one or more cats, dogs, or other animals to the window sill (not visible).

Figure 5:
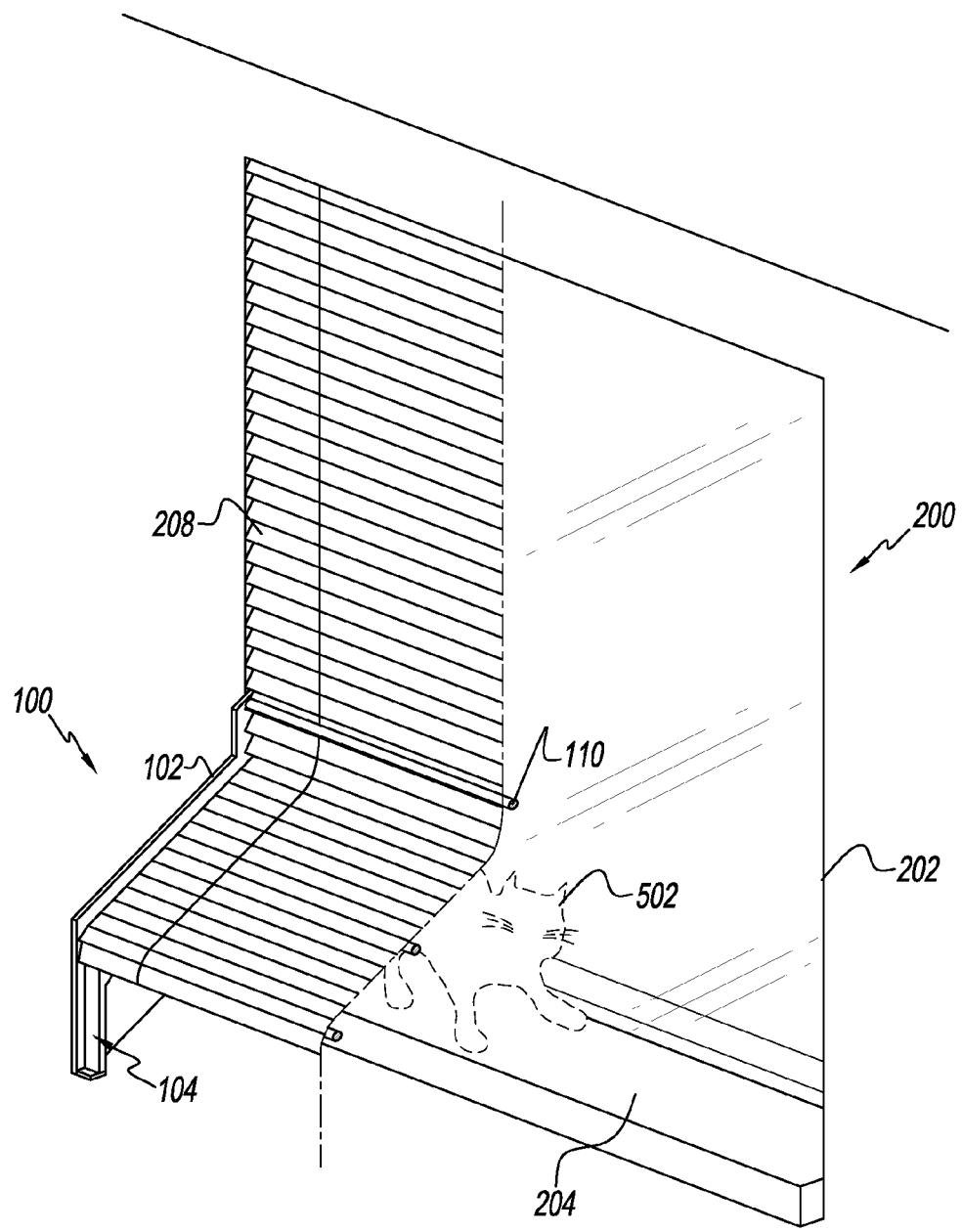
FIG. 5 is a perspective view of a window blind protector positioned within a window frame of a window, in accordance with an embodiment of the invention.

FIG. 5 is a perspective view of a window blind protector 100 positioned within a window frame 202 of a window 200, in accordance with an embodiment of the invention. In one embodiment, a window blind protector 100 includes, but is not limited to, a first panel 102 that is positionable on a first side (not visible) of a window sill 204 and that includes a first guide portion 104; a second panel (not illustrated) that is positionable on a second side of the window sill 204 and that includes a second guide portion (not shown); and a first cross-member 110 that is configured to extend between the first panel 102 and the second panel (not shown) to brace the first 102 and second panels against opposing walls of the window frame 202 on the window sill 204. The first 104 and second (not shown) guide portions are shown diverting window blind 208 away from the window sill 204. Thus, the window blind protector 100 establishes a space below the lowered window blind 208 and the window 200, which space allows access and usage of the window sill 204 without sacrificing privacy. An animal 502 is depicted on the window sill 204 while the window blind 208 is lowered. Animal 502 can include a cat, a dog, a rabbit, a turtle, a snake, a rodent, a bird, or any other living creature. Therefore, the animal 502 can use the window sill 204 and access the window sill 204 when the window blind 208 is lowered. Additionally, plants and other objects, such as pictures, books, and decorations can be placed on the window sill 204 without interfering with a lowered window blind 208.

While preferred and alternate embodiments of the device have been illustrated and described, as noted above, many changes can be made without departing from the spirit and scope of the invention. Although window blind protector 100 has been illustrated as being positioned on a window sill 204 within window frame 202, in certain embodiments, the window blind protector is configured to attach to the wall external of and adjacent to the window frame 202. For example, in motor homes or boats, the window frame may only be 0.5 to 1 inches deep. In such situations, the first 102 and second 106 panels can affix to walls adjacent to the window 200 with the first 104 and second 108 guide portions extending into the window frame 202 to receive and divert the window blind 208 away from window sill 204. Affixation can be accomplished with adhesives, mechanical fasteners. In such situations, the platform 124 can be utilized to extend a depth of the window sill 204 for use by animal 502 or other item.

Figure 6:
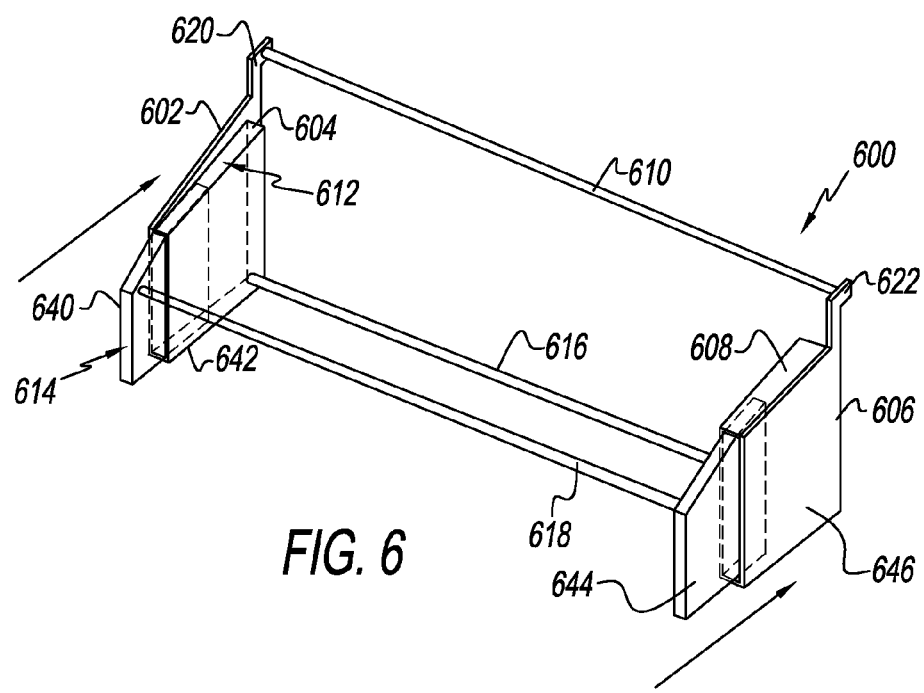
FIG. 6 is a perspective view of a window blind protector, in accordance with an embodiment of the invention.

FIG. 6 is a perspective view of a window blind protector 600, in accordance with an embodiment of the invention. In one embodiment, a window blind protector 600 includes, but is not limited to, a first retractable panel 602 that is positionable on a first side of a window sill (not shown) and that includes a first guide portion 604, the first guide portion 604 having an incline portion 612 and a vertical portion 614; a first vertical tab 620 that extends from the first retractable panel 602 to a point above the first guide portion 604; a second retractable panel 606 that is positionable on a second side of the window sill (not shown) and that includes a second guide portion 608, the second guide portion 608 having an incline portion and a vertical portion; a second vertical tab 622 that extends from the second retractable panel 606 to a point above the second guide portion 608; a first cross-member 610 that is configured to extend between the first vertical tab 620 and the second vertical tab 622 to brace the first 602 and second 606 retractable panels against opposing walls of the window frame (not shown), wherein the first 604 and second 608 guide portions are configured to divert a window blind (not shown) away from the window sill (not shown) under the first cross-member 610 and along the incline and vertical portions of the first 604 and second 608 guide portions when the window blind (not shown) is lowered. In certain embodiments, the first retractable panel 602 includes an extension panel 640 and a mount panel 642. The second retractable panel 606 similarly includes an extension panel 644 and a mount panel 646. The mount panel 642 and the mount panel 646 are positionable within a window frame (not shown) on a window sill (not shown) and secured therein using the first cross member 610 and alternatively a second cross member 616. The extension panel 640 and the extension panel 644 retractably extend from the mount panel 642 and the mount panel 646, respectively. A third cross member 618 can extend between the extension panel 640 and the extension panel 644.

Figure 7:
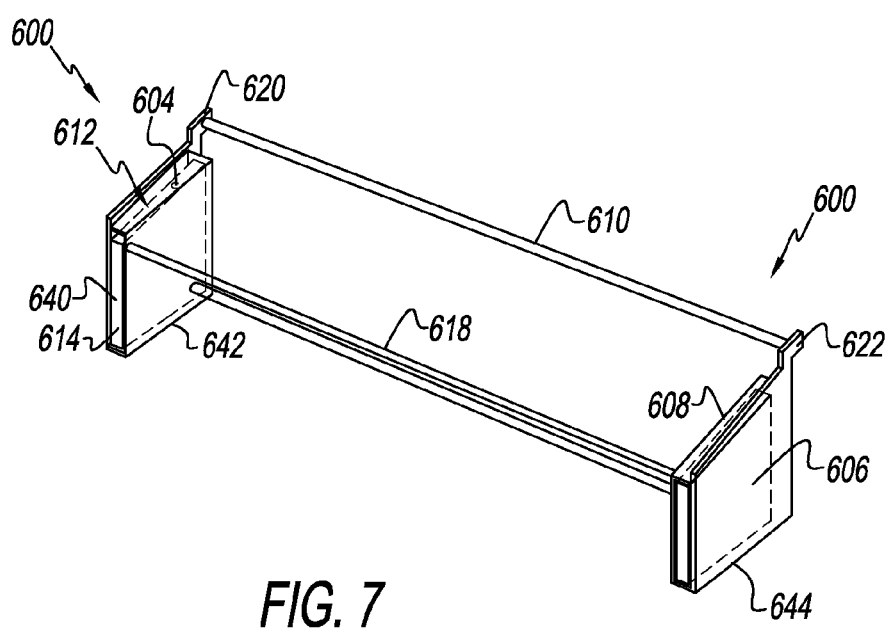
FIG. 7 is a perspective view of a window blind protector, in accordance with an embodiment of the invention.

FIG. 7 is a perspective view of a window blind protector 600, in accordance with an embodiment of the invention. In one embodiment, a window blind protector 600 includes, but is not limited to, a first retractable panel 602 that is positionable on a first side of a window sill (not shown) and that includes a first guide portion 604, the first guide portion 604 having an incline portion 612 and a vertical portion 614; a first vertical tab 620 that extends from the first retractable panel 602 to a point above the first guide portion 604; a second retractable panel 606 that is positionable on a second side of the window sill (not shown) and that includes a second guide portion 608, the second guide portion 608 having an incline portion and a vertical portion; a second vertical tab 622 that extends from the second retractable panel 606 to a point above the second guide portion 608; a first cross-member 610 that is configured to extend between the first vertical tab 620 and the second vertical tab 622 to brace the first 602 and second 606 retractable panels against opposing walls of the window frame (not shown), wherein the first 604 and second 608 guide portions are configured to divert a window blind (not shown) away from the window sill (not shown) under the first cross-member 610 and along the incline and vertical portions of the first 604 and second 608 guide portions when the window blind (not shown) is lowered. In certain embodiments, the first retractable panel 602 includes an extension panel 640 and a mount panel 642. The second retractable panel 606 similarly includes an extension panel 644 and a mount panel 646. The mount panel 642 and the mount panel 646 are positionable within a window frame (not shown) on a window sill (not shown) and secured therein using the first cross member 610 and alternatively a second cross member 616. The extension panel 640 and the extension panel 644 retractably extend from the mount panel 642 and the mount panel 646, respectively. A third cross member 618 can extend between the extension panel 640 and the extension panel 644.

Therefore, the window blind protector 600 can be disposed within a window frame (not shown) and can be retracted (FIG. 7) to eliminate or reduce interference of the window blind protector when not in use. The window blind protector 600 can be extended by manually or automatically (e.g., through use of one or more motors) extending the extension panel 640 and the extension panel 644 (FIG. 6). Once extended, a lowered window blind (not shown) will be diverted along the first 604 and second 608 guide portions away from a window sill (not shown).

While preferred and alternate embodiments of the device have been illustrated and described, as noted above, many changes can be made without departing from the spirit and scope of the invention. In certain embodiments, the first 602 and second 606 retractable panels can be differently sized or shaped. For instance, the first 602 and second 606 retractable panels can be longer or shorter. In certain embodiments, the first 620 and second 622 vertical tabs can be differently positioned, such as more forward or aft. In other embodiments, the first 604 and second 608 guide portions can extend further aft to receive a window blind (not shown) and direct the window blind under the first cross member 610. Additionally, three or more extension panels may be incorporated into the window blind protector 600 (e.g., telescoping extension panels). In some embodiments, the extension panel 640 and the extension panel 644 may slide adjacent to the mount panel 642 and the mount panel 646 as opposed to within as is depicted. Alternatively, the extension panel 640 and the extension panel 644 can snap, hook, or otherwise attach to the mount panel 642 and the mount panel 646.

Figure 8:
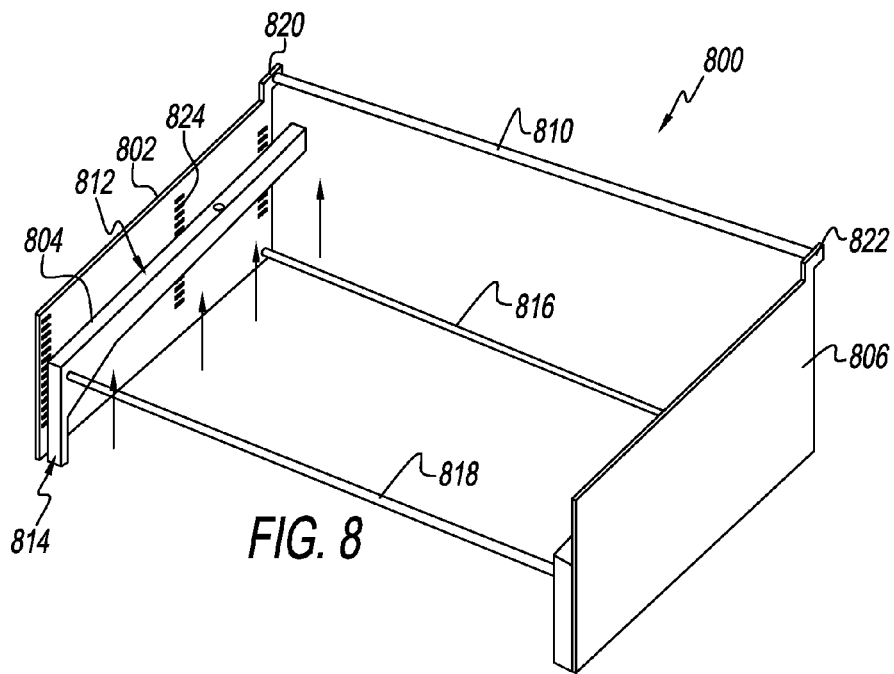
FIG. 8 is a perspective view of a window blind protector, in accordance with an embodiment of the invention.

FIG. 8 is a perspective view of a window blind protector 800, in accordance with an embodiment of the invention. In one embodiment, a window blind protector 800 includes, but is not limited to, a first panel 802 that is positionable on a first side of a window sill (not shown) and that includes a first guide portion 804; a second panel 806 that is positionable on a second side of the window sill (not shown) and that includes a second guide portion 808; and a first cross-member 810 that is configured to extend between the first panel 802 and the second panel 806 to brace the first 802 and second panels 806 against opposing walls of the window frame (not shown), wherein the first 804 and second 808 guide portions are configured to divert a window blind (not shown) away from the window sill (not shown) when the window blind (not shown) is lowered.

In one particular embodiment, the first 804 and second 808 guide portions have an inclined portion 812 and a vertical portion 114. In yet a further embodiment, the first cross member 810 is retractably extensible. In an additional embodiment, the first cross member 810 is a tension rod. In another embodiment, the first 804 and second 808 guide portions are ledges. In an alternative embodiment, a second cross-member 816 is configured to extend between the first panel 802 and the second panel 806 below the first cross-member 810 to further brace the first 802 and second 806 panels against opposing walls of the window frame (not shown). In a further embodiment, a third cross-member 818 is configured to adjustably extend between opposing ends of the first 802 and second 806 panels. In one particular embodiment, the first panel 802 includes a first vertical tab 820 that extends from the first panel 802 to a point above the first guide portion 804 and that is adjustable (not shown) along at least a portion of a length of the first panel 802 and wherein the second panel 806 includes a second vertical tab 822 that extends from the second panel 806 to a point above the second guide portion 808 and that is adjustable (not shown) along at least a portion of a length of the second panel 806. In certain embodiments, the first vertical tab 820 and the second vertical tab 822 are height adjustable (not shown). The first 804 and second 808 guide portions are movable relative to one or more tracks 824 on the first 802 and second 808 panels to adjust at least one of a position or angle of the first 804 and second 808 guide portions. For example, the first 804 and second 808 guide portions can be moved up or down or rotated to accommodate different sized animals or objects on a window sill (not shown).

Figure 9:
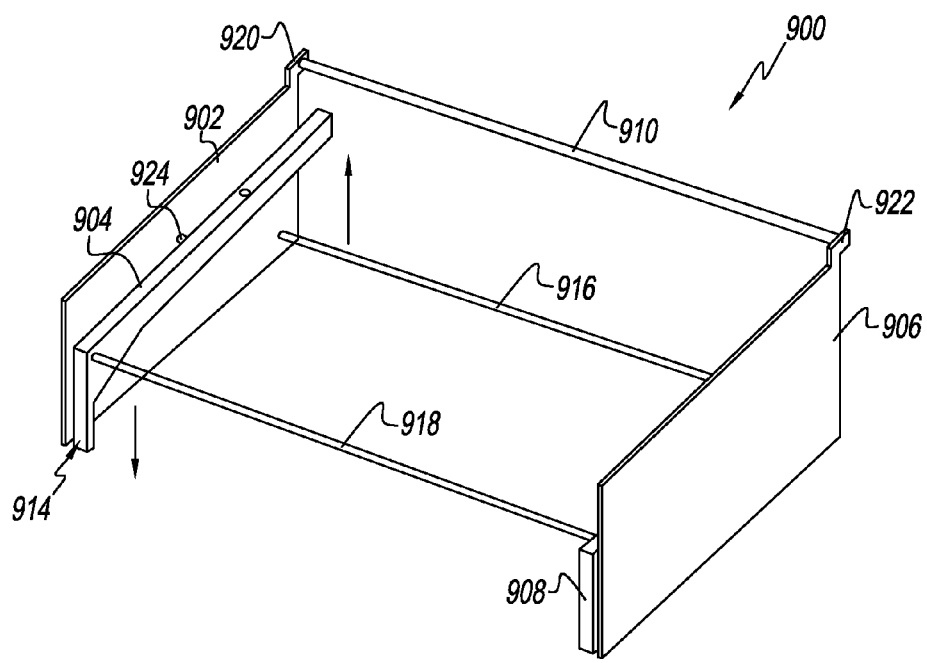
FIG. 9 is a perspective view of a window blind protector, in accordance with an embodiment of the invention.

FIG. 9 is a perspective view of a window blind protector 900, in accordance with an embodiment of the invention. In one embodiment, a window blind protector 900 includes, but is not limited to, a first panel 902 that is positionable on a first side of a window sill (not shown) and that includes a first guide portion 904; a second panel 906 that is positionable on a second side of the window sill (not shown) and that includes a second guide portion 908; and a first cross-member 910 that is configured to extend between the first panel 902 and the second panel 906 to brace the first 902 and second panels 906 against opposing walls of the window frame (not shown), wherein the first 904 and second 908 guide portions are configured to divert a window blind (not shown) away from the window sill (not shown) when the window blind (not shown) is lowered.

In one particular embodiment, the first 904 and second 908 guide portions have an inclined portion 912 and a vertical portion 914. In yet a further embodiment, the first cross member 910 is retractably extensible. In an additional embodiment, the first cross member 910 is a tension rod. In another embodiment, the first 904 and second 908 guide portions are ledges. In an alternative embodiment, a second cross-member 916 is configured to extend between the first panel 902 and the second panel 906 below the first cross-member 910 to further brace the first 902 and second 906 panels against opposing walls of the window frame (not shown). In a further embodiment, a third cross-member 918 is configured to adjustably extend between opposing ends of the first 902 and second 906 panels. In one particular embodiment, the first panel 902 includes a first vertical tab 920 that extends from the first panel 902 to a point above the first guide portion 904 and that is adjustable (not shown) along at least a portion of a length of the first panel 902 and wherein the second panel 906 includes a second vertical tab 922 that extends from the second panel 906 to a point above the second guide portion 908 and that is adjustable (not shown) along at least a portion of a length of the second panel 906. In certain embodiments, the first vertical tab 920 and the second vertical tab 922 are height adjustable (not shown). The first 904 and second 908 guide portions are movable relative to a pivot point 924 on the first 902 and second 908 panels (pivot point not visible) to adjust an angle of the first 904 and second 908 guide portions. For example, the first 904 and second 908 guide portions can be rotated to increase or decrease slope to accommodate different sized animals or objects on a window sill (not shown).

Figure 10:
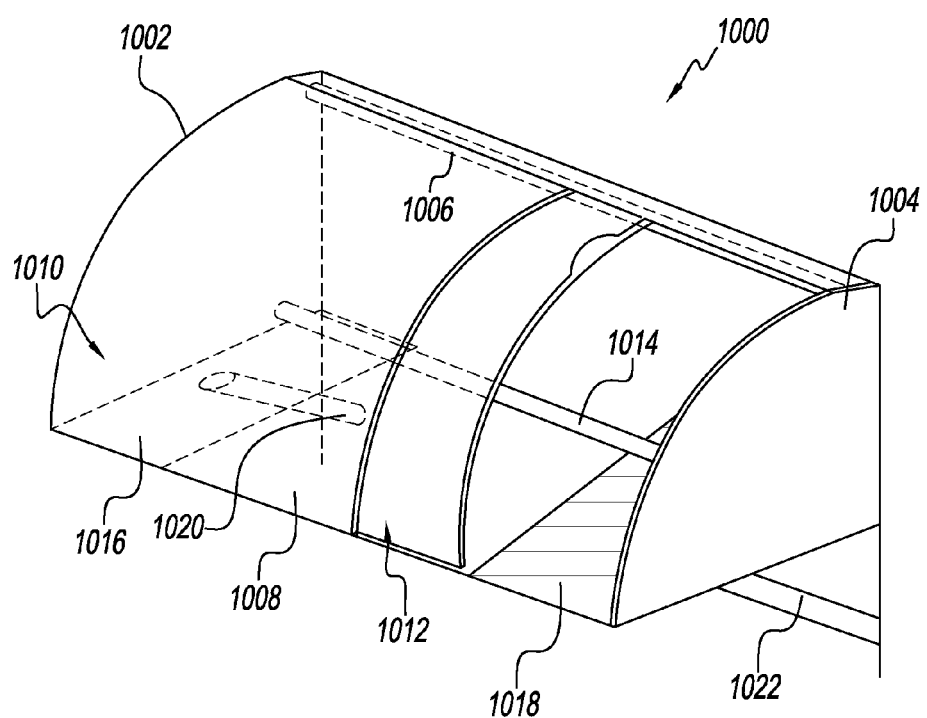
FIG. 10 is a perspective view of a window blind protector, in accordance with an embodiment of the invention.

FIG. 10 is a perspective view of a window blind protector 1000, in accordance with an embodiment of the invention. In one embodiment, a window blind protector includes, but is not limited to, a first panel 1002 that is positionable on a first side of a window sill (not shown); a second panel 1004 that is positionable on a second side of the window sill (not shown); a first cross-member 1006 that is configured to extend between the first panel 1002 and the second panel 1004 to brace the first 1002 and second 1004 panels against opposing walls of the window frame (not shown); and a retractably extensible visual shield 1008 disposed between the first 1002 and second 1004 panels, wherein the first 1002 and second 1004 panels are configured to support a window blind above the window sill when the window blind is lowered (not shown).

In one embodiment, the retractably extensible visual shield 1008 is length adjustable. For example, the retractably extensible visual shield 1008 can include a first shield portion 1010 and a second shield portion 1012, which slide relative to one another. In another embodiment, a second cross-member 1014 can extend between the first panel 1002 and the second panel 1004 below the first cross-member 1006. In certain other embodiments, a first platform 1016 is coupled to the first panel 1002 and the second platform 1018 is coupled to the second panel 1004. The first platform 1016 is supported with a brace 1020, which is configured to rest against a wall under a window (not shown). The second platform 1018 is supported with a brace 1022, which is configured to rest against a wall under a window (not shown).

Accordingly, the window blind protector 1000 can be adjustably configured and adapt to different sized window frames. Once positioned within a window frame, the window blind protector 1000 can be braced against opposing walls of the window frame. A lowered window blind then rests on top of the window blind protector 1000. The retractably extensible visual shield 1008 can be partially opened or closed to enable access to a window sill, animal, or object. The first 1016 and second 1018 platforms extend a window sill and are usable by an animal or for objects or items.

Figure 11:
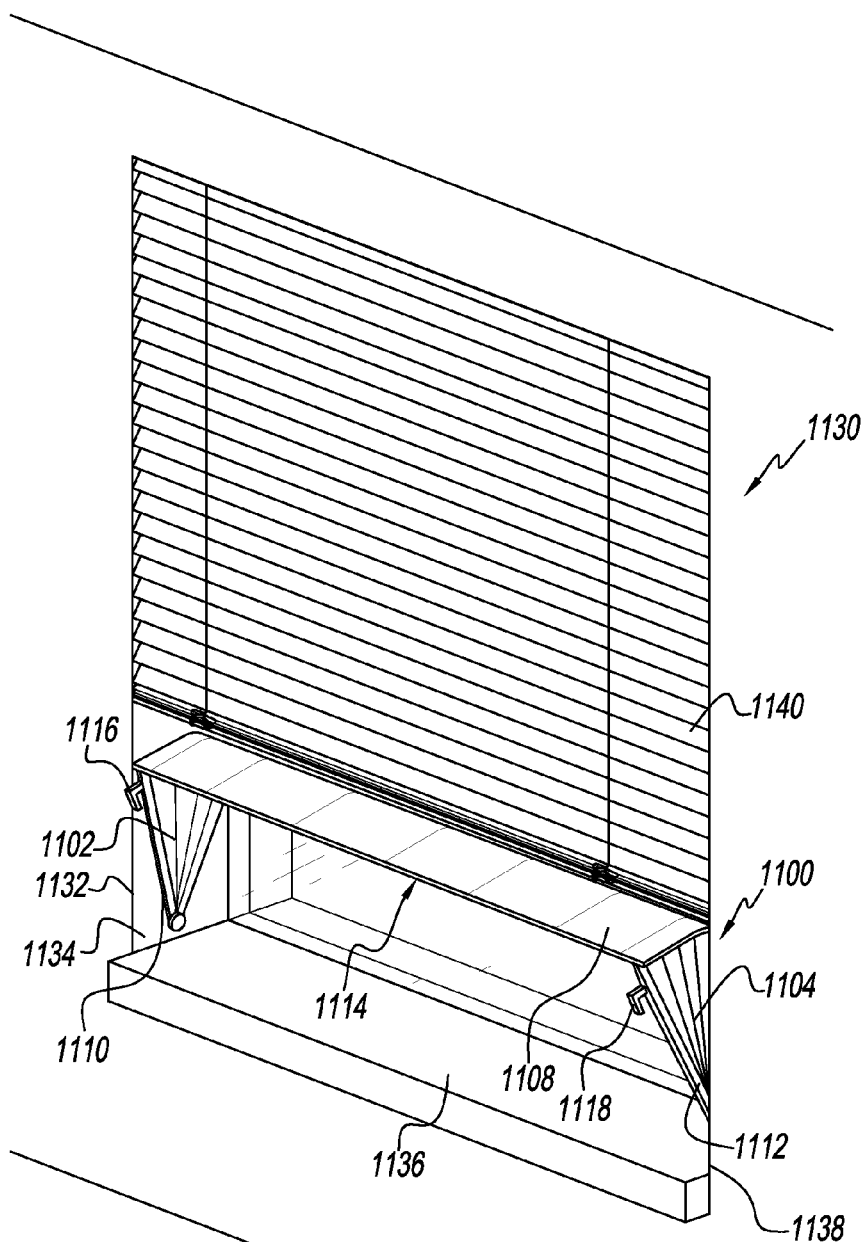
FIG. 11 is a perspective view of a window blind protector positioned within a window frame of a window, in accordance with an embodiment of the invention.

FIG. 11 is a perspective view of a window blind protector 1100 positioned within a window frame 1132 of a window 1130, in accordance with an embodiment of the invention. In one embodiment, a window blind protector 1100 includes, but is not limited to, a first panel 1102 that is positionable on a first side 1134 of a window sill 1136; a second panel 1104 that is positionable on a second side 1138 of the window sill 1136; a first cross-member (not visible) that is configured to extend between the first panel 1102 and the second panel 1104 to brace against opposing walls of the window frame 1132; and a retractably extensible visual shield 1108 disposed between the first 1102 and second 1104 panels, wherein the window blind protector 1100 is configured to support a window blind 1140 above the window sill 1136 when the window blind 1140 is lowered.

In one embodiment, the window blind protector 1100 includes a first pivot arm 1110 coupled to the first panel 1102; a second pivot arm 1112 coupled to the second panel 1104; and a second cross-member 1114 that extends between the first arm 1110 and the second arm 1112, wherein the retractably extensible visual shield 1108 is coupled at one end to the first cross-member (not visible) and coupled at another end to the second cross-member 1114 such that the retractably extensible visual shield 1108 is extensible upon pivoting of the first 1110 and second 1112 pivot arms. First handle 1116 and second handle 1118 are included on the first pivot arm 1110 and the second pivot arm 1112, respectively. Accordingly, the window blind protector 1100 is fully or partially retractable within window frame 1132 and extendable by pulling on the first 1110 and second 1112 pivot arms.

Figure 12:
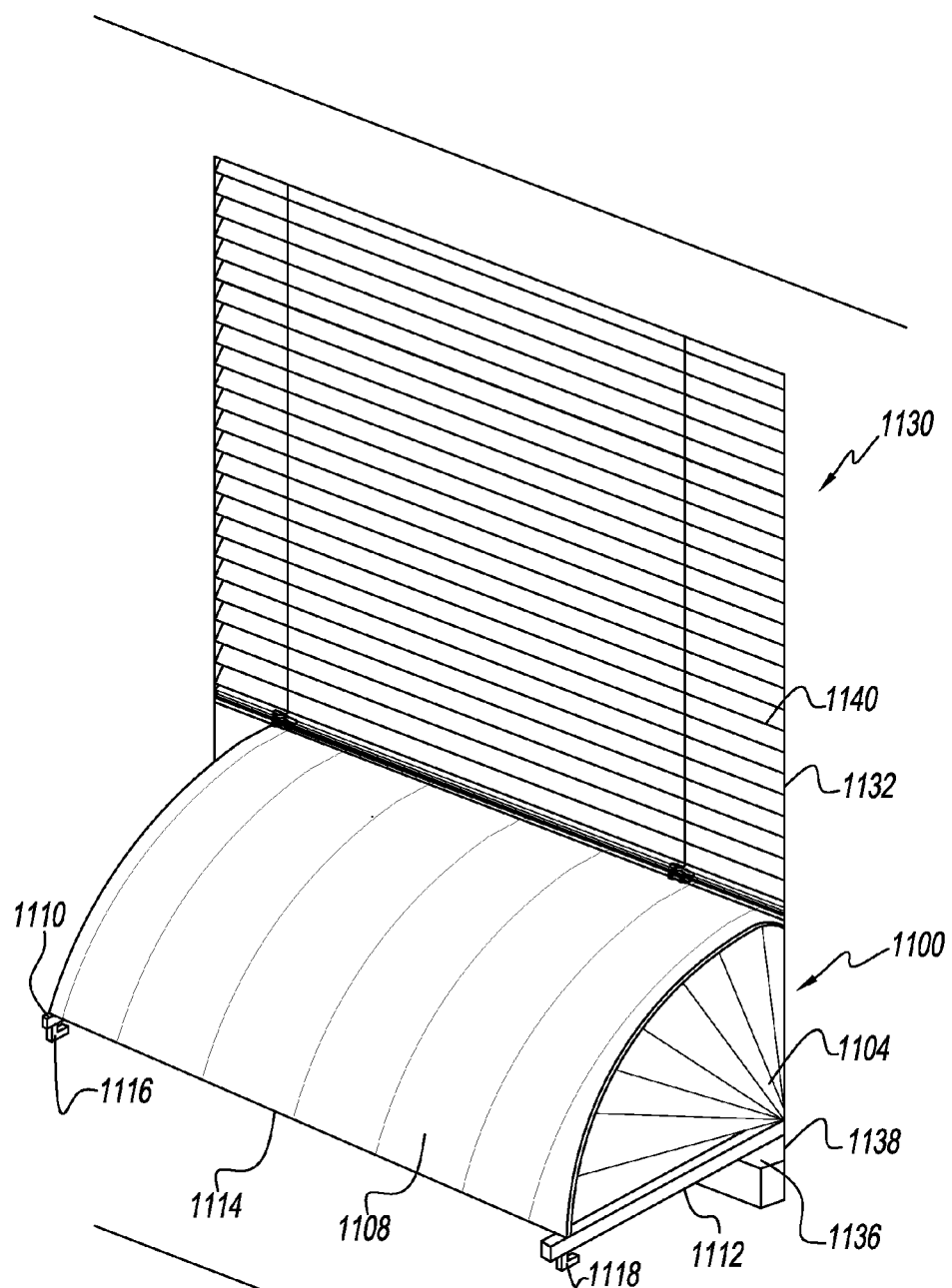
FIG. 12 is a perspective view of a window blind protector positioned within a window frame of a window, in accordance with an embodiment of the invention.

FIG. 12 is a perspective view of a window blind protector 1100 positioned within a window frame 1132 of a window 1130, in accordance with an embodiment of the invention. In one embodiment, a window blind protector 1100 includes, but is not limited to, a first panel (not visible) that is positionable on a first side (not visible) of a window sill 1136; a second panel 1104 that is positionable on a second side 1138 of the window sill 1136; a first cross-member (not visible) that is configured to extend between the first panel (not visible) and the second panel 1104 to brace against opposing walls of the window frame 1132; and a retractably extensible visual shield 1108 disposed between the first (not visible) and second 1104 panels, wherein the window blind protector 1100 is configured to support a window blind 1140 above the window sill 1136 when the window blind 1140 is lowered.

In one embodiment, the window blind protector 1100 includes a first pivot arm 1110 coupled to the first panel (not visible); a second pivot arm 1112 coupled to the second panel 1104; and a second cross-member 1114 that extends between the first arm 1110 and the second arm 1112, wherein the retractably extensible visual shield 1108 is coupled at one end to the first cross-member (not visible) and coupled at another end to the second cross-member 1114 such that the retractably extensible visual shield 1108 is extensible upon pivoting of the first 1110 and second 1112 pivot arms. First handle 1116 and second handle 1118 are included on the first pivot arm 1110 and the second pivot arm 1112, respectively. Accordingly, the window blind protector 1100 is fully or partially retractable within window frame 1132 and extendable by pulling on the first 1110 and second 1112 pivot arms.

Various aspects of embodiments disclosed herein can be composed of metal, fabric, composite, synthetic, plastic, wood, glass, rubber, or any other known material.

Specific details of certain embodiments of the invention are set forth in the following description and in FIGS. 1-12 to provide a thorough understanding of such embodiments. The present invention may have additional embodiments, may be practiced without one or more of the details described for any particular described embodiment, or may have any detail described for one particular embodiment practiced with any other detail described for another embodiment.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system comprising:
   a first panel positioned on a first side of a window frame and that includes a first inclined ledge having a first vertical sidewall;
   a second panel, the second panel positioned on a second side of the window frame and that includes a second inclined ledge having a second vertical sidewall;
   a retractably extensible tension rod that extends between the first vertical sidewall of the first panel and the second vertical sidewall of the second panel above the first inclined ledge and the second inclined ledge to tensionally brace the first panel and the second panel against the first side of the window frame and the second side of the window frame; and
   a retractable window blind that when lowered is diverted away from the window frame under the retractably extensible tension rod and via the first inclined ledge and the second inclined ledge,
   wherein the first vertical sidewall and the second vertical sidewall are configured to constrain the retractable window blind when lowered against lateral movement and wherein the retractably extensible tension rod is configured to at least partially limit vertical movement of the retractable window blind when lowered.

2. The system of claim 1, wherein the first and second ledges each have a vertical portion.

3. The system of claim 1, further comprising:
   a second retractably extensible tension rod that is configured to extend between the first panel and the second panel below the retractably extensible tension rod to further tensionally brace the first and second panels against the first side and the second side of the window frame.

4. The system of claim 1, wherein the first panel and the second panel are collapsible.

5. The system of claim 1, wherein the first panel includes a first vertical tab that extends from the first panel to a point above the first inclined ledge and wherein the second panel includes a second vertical tab that extends from the second panel to a point above the second inclined ledge.

6. The system of claim 1, wherein first panel and the second panel are retractably extensible.

7. The system of claim 1, wherein the first and second inclined ledges are movable to adjust at least one of a position or an angle.

8. The system of claim 1, further comprising:
at least one retractably extensible visual shield that extends between the first panel and the second panel.

9. The system of claim 1, further comprising:
at least one motor configured to coil and release at least one string of the retractable window blind; and
at least one control unit configured to operate the at least one motor in accordance with one or more instructions.

10. The system of claim 1, further comprising:
at least one platform that extends horizontally from at least one of the first panel or the second panel for extending a window sill.

11. The system of claim 1, wherein the first panel and the second panel are telescopically extensible and retractable.

12. The system of claim 1, wherein the retractably extensible tension rod is configured to tensionally brace the first panel and the second panel against the first and second sides of the window frame without use of fasteners.

13. The system of claim 1, wherein the first and second inclined ledges are physically independent of one another to maintain window visibility.

14. The system of claim 1, wherein the first and second inclined ledges are height adjustable.

15. The system of claim 1, wherein the first and second inclined ledges are incline adjustable.

16. The system of claim 1, further comprising:
a cross-member configured to adjustably extend between opposing ends of the first and second panels.

17. The system of claim 1, wherein at least one of the first or second panels includes an access door.

18. The system of claim 1, further comprising:
a platform extending from at least one of the first or second panels; and
a brace that supports the platform against a wall.

* * * * *